Figure 1:
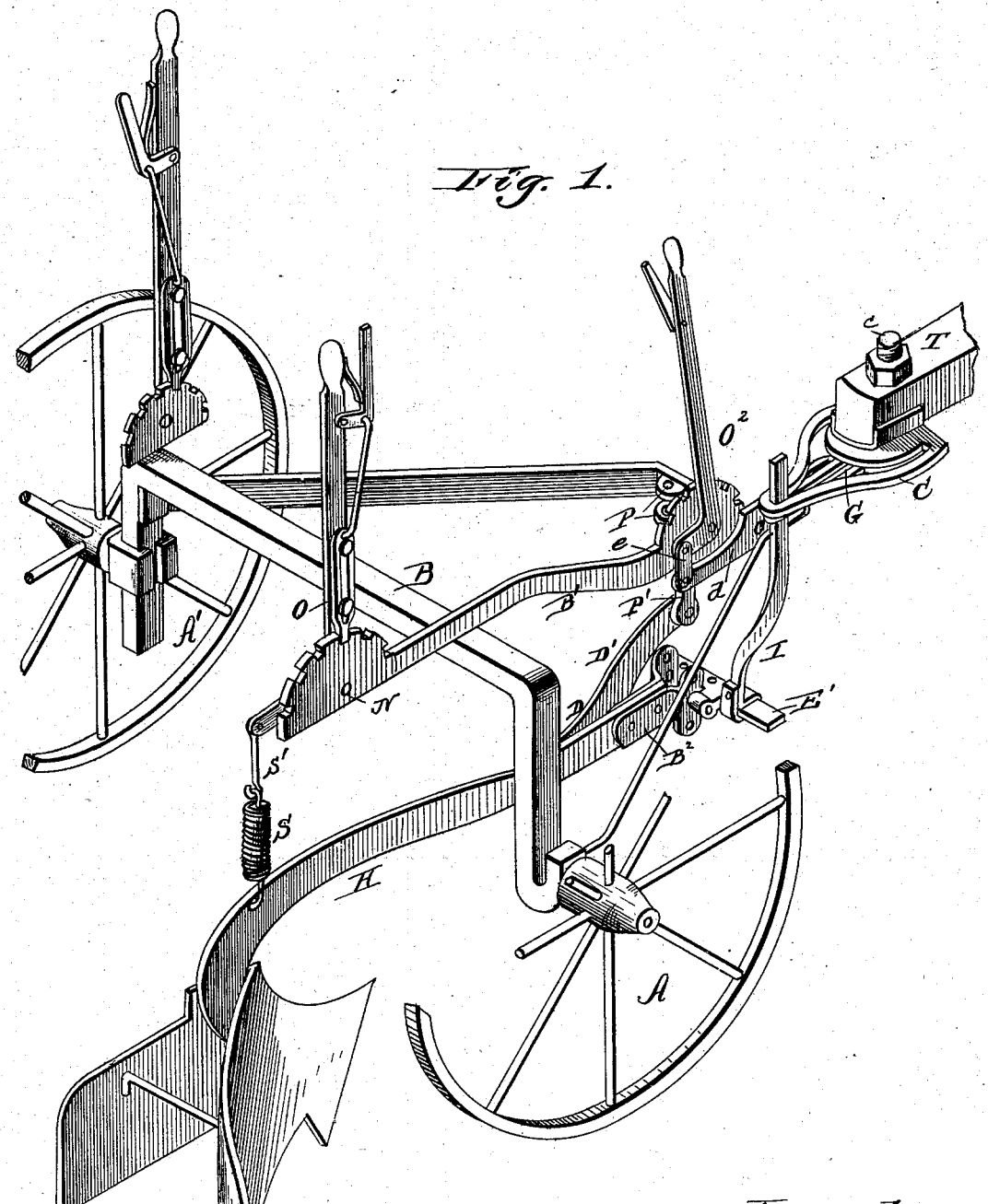

(No Model.)  2 Sheets—Sheet 1.

J. I. HOKE.
SULKY PLOW.

No. 258,202.  Patented May 16, 1882.

Witnesses:
H. C. McArthur
W. R. Keyworth

Inventor:
J. I. Hoke
per
J. M. Alexander
Attorney

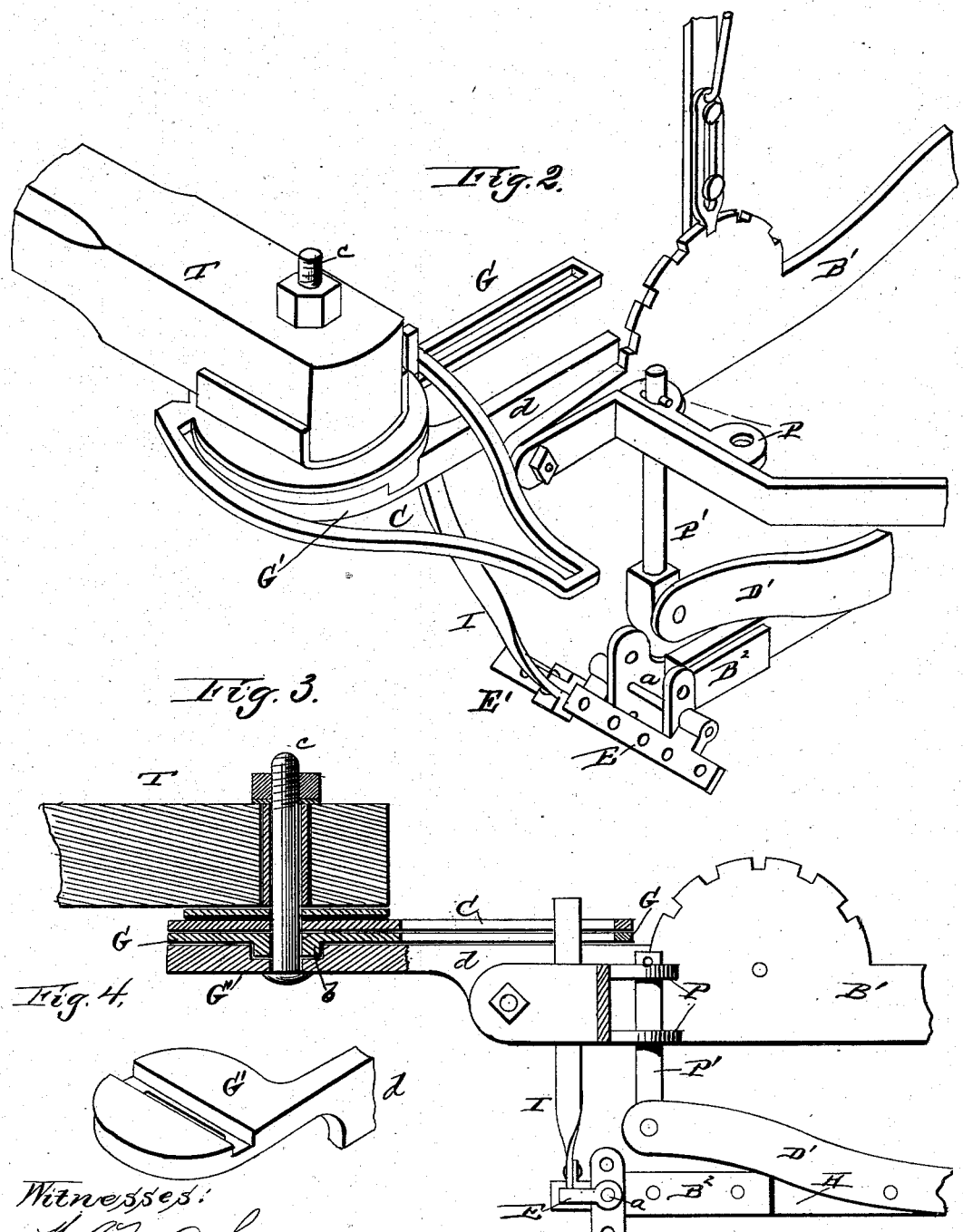

UNITED STATES PATENT OFFICE.

JOHN I. HOKE, OF SOUTH BEND, INDIANA.

SULKY-PLOW.

SPECIFICATION forming part of Letters Patent No. 258,202, dated May 16, 1882.

Application filed February 26, 1881. (No model.)

*To all whom it may concern:*

Be it known that I, JOHN I. HOKE, a citizen of the United States, residing at South Bend, in the county of St. Joseph, State of Indiana, have invented certain new and useful Improvements in Sulky-Plows, of which the following is such a full, clear, and exact description as will enable others skilled in the art to make and use the same.

Figure 1 is a rear perspective view of the machine, showing portions of the wheels and draft-tongue broken away. Fig. 2 is a perspective view of the locking and unlocking devices for the tongue. Fig. 3 is a vertical sectional view of the same. Fig. 4 is a perspective of the slotted bracket.

The nature of my invention consists in the combination and arrangement of devices hereinafter claimed.

A designates the furrow-wheel; A', the land-wheel; B, the arched frame, on which may be suitably applied the driver's seat. (Not shown in the drawings.) The axle of the furrow-wheel is rigidly and immovably secured to the frame B, and the axle of the land-wheel is adjustably applied to the said frame. At this end of frame B means are applied by which the attendant on his seat can adjust this frame so as to keep it horizontal, whether the machine be plowing or moving on level ground.

B' designates a longitudinal bar of frame B, which is rigid on this frame, near one end thereof, and which is sustained by a diagonal brace, terminating at its front end in a transverse portion, which has a number of vertical perforations, P, through it.

In plows that are rigidly secured to the sulky, as the wheel on the land side rises and falls by traveling over uneven ground the plow is raised and lowered, making an undulating furrow. By interposing a spring, S, and a link, S', between the plow-beam H and the short arm of a lever, O, which is pivoted at N to the bar B' of frame B, the plow will run steady in the furrow, and will not be materially affected by the uneven motion of the transporting-wheels. The said spring S and its link also allow lateral motion of the plow, enabling it to glance from a stone or other obstruction, thus lessening the danger of breakage and preventing injurious shocks.

D, Fig. 1, is a cast-iron neck, which is bolted to the plow-beam H, and which terminates at its forward end in a flat portion, D', which is pivoted by a horizontal bolt to a pin, P'. A tubular pivot may be formed on the pin or the neck for the bolt to pass through. This latter joint allows the plow to move vertically. The pin P' passes through one or the other of the holes P of the front transverse extension of frame B, and is loosely connected thereto by a pin, c, provided with a nut and washer, thus allowing horizontal motion to the plow and keeping it upright. By having more than one hole P the clevis or draft end of the beam H may be shifted to the right or the left, thus regulating the width of the furrows. When the said pin P' is adjusted from the tongue T to the left the plow takes more land and the furrows are widened.

B², Figs. 2 and 3, designates part of the double clevis to which the other part, E, of the clevis is pivoted by a horizontal transverse bolt, $a$. This clevis E may be attached higher or lower to the clevis B², as may be found necessary to aid in equalizing the draft. The clevis E has an arm, E', formed on it, upon which a latch-arm, I, slides. When the plow is once adjusted the latch arm I is stationary on the clevis-arm E'; but as the beam H is moved to the right or left the said latch-arm will take a new position on the arm E'. The upper end of the latch-arm extends through a slotted guide, G, (which is stationary, and which will allow said arm to vibrate only back and forth in the direction of the length of the machine,) and through a heart-shaped catch, C, which turns with the tongue T. When there is no draft on the clevis E it drops down, as indicated in Fig. 2, by its own weight and the weight of the double-tree, which is attached to it. This throws the latch-arm I forward, as indicated in Fig. 2. The tongue T is then free to move to any desired position, either to the right or left. When the horses again pull on the clevis E it rises, thus throwing back the latch-arm I, and as the plow turns in the direction of the draft this latch-arm presses into the contracted rear extremity of the catch C, and thus locks the tongue in position so long as the horses continue to pull in this way, and by these means the tongue is locked or unlocked automatically by the draft of the team. The catch C has on its upper surface two lugs, between which the tongue T is held. This catch thus turns with the tongue and bears on plate G, which in turn bears on plate G'. The plate G slides on plate G' to the right or left, and is held from turning thereon by means of a ridge, b, which fits into a corresponding groove in plate G'. The three plates and the tongue are held together by a bolt, c. There is an oblong slot through plate G' to allow the bolt to move as the other plates are adjusted. Plate G' has also a bracket-support, d, which is pivoted to the bar B' by a transverse bolt, and the rear extension of the bracket d is connected by a link, e, to the short angular arm of a hand-lever, $O^2$, by which it can be raised or lowered, thus depressing or raising the end of the tongue, or, practically, through the sulky-frame and its attachments, lowering or raising the front end of the plow-beam, thereby causing the point of the plow to enter the ground more or less deeply, and regulating the depth of the furrow.

The lever O is pivoted to the beam B', and provided with a catch and a toothed segment, by which the said lever is held in any desired position. This lever O is placed near the seat of the driver and over the plow, as shown. The lever $O^2$ is provided with a catch and toothed segment-like lever O for holding the tongue after adjustment.

Having thus fully described my invention, what I claim as new, and desire to secure by Letters Patent, is—

1. The combination of the clevis $B^2$, fixed to the plow-beam, the draft-clevis E and its extension E', pivoted to clevis $B^2$, the latch-arm I, the guide G, fixed to pivoted bracket G', and the open heart-shaped catch C, fixed to the pivoted tongue, substantially as and for the purposes described.

2. The combination of the pivoted heart-shaped catch C, having the draft-tongue rigidly secured to it, the guide G, the vibrating catch-arm I, and the pivoted clevis to which this arm is attached, substantially as described.

JOHN I. HOKE.

Witnesses:
WILLIS A. BUGBEE,
JACOB WOLVERTON.